(12) United States Patent
Musuluri (10) Patent No.: US 11,188,549 B2
(45) Date of Patent: Nov. 30, 2021

(54) SYSTEM AND METHOD FOR DISPLAYING TABLE SEARCH RESULTS

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 0 days.

(21) Appl. No.: 14/724,433

(22) Filed: May 28, 2015

(65) Prior Publication Data

US 2015/0347535 A1    Dec. 3, 2015

Related U.S. Application Data

(60) Provisional application No. 62/003,560, filed on May 28, 2014.

(51) Int. Cl.
*G06F 16/248* (2019.01)
*G06F 16/951* (2019.01)

(52) U.S. Cl.
CPC .......... *G06F 16/248* (2019.01); *G06F 16/951* (2019.01)

(58) Field of Classification Search
CPC ......... G06F 17/30554; G06F 17/30864; G06F 17/30696

USPC .......................................................... 707/722
See application file for complete search history.

(56) References Cited

U.S. PATENT DOCUMENTS

| | | | |
|---|---|---|---|
| 6,567,846 B1* | 5/2003 | Garg | G06F 16/951 709/218 |
| 6,732,102 B1* | 5/2004 | Khandekar | G06F 16/30 |
| 8,510,325 B1* | 8/2013 | Betz | G06F 16/93 707/769 |
| 8,843,856 B2* | 9/2014 | Burns | G06F 17/30899 707/707 |
| 8,909,619 B1* | 12/2014 | Riley | G06F 9/4443 707/722 |
| 8,972,368 B1* | 3/2015 | de Sousa | G06F 17/30477 707/705 |
| 9,047,345 B1* | 6/2015 | Liu | G06F 17/30867 |
| 2003/0097357 A1* | 5/2003 | Ferrari | G06F 16/954 |
| 2003/0229854 A1 | 12/2003 | Lemay | |
| 2007/0067267 A1 | 3/2007 | Ives | |

\* cited by examiner

*Primary Examiner* — Sheree N Brown (57) ABSTRACT

Methods and Systems to display the results of a search operation are provided. More particularly the invention relates to a method to display search results comprising a relevant portion of the data in a tabular form. The said result comprises a search extract preserving table characteristics. The extract may further comprise of one or more table properties.

8 Claims, 6 Drawing Sheets

```
Firefox ▽                                               _ ☐ ✕
(←) www.funtoi.com              ▽ C  W▽ W🔎  ⇩ 🏠 ⌘ ▽| 🖐 ▽
[ ] 2012 summer olympics russia south korea  ⊕    ╱─401
```

| 2012 summer olympics russia south korea | Search |

501
2012 Summer Olympics - Wikipedia, the free encyclopedia
503— http://en.wikipedia.org/wiki/2012_Summer_Olympics_medals_table — 305
Table, Total Rows: 87

2012 Summer Olympics medal table

502 {

| Rank | NOC | Gold | Silver | Bronze | Total |
|---|---|---|---|---|---|
| 1 | United States (USA) | 46 | 29 | 29 | 104 |
| ... | | | | | |
| 4 | Russia (RUS) | 24 | 26 | 32 | 82 |
| 5 | South Korea (KOR) | 13 | 8 | 7 | 28 |
| ... | | | | | |
| 79 | Tajikistan | 0 | 0 | 1 | 1 |
| Total (85 NOCs) | | 302 | 304 | 356 | 962 |

302, 306, 301, 307, 303

List of Olympic Games host cities - Wikipedia, the free encyclopedia
http://en.wikipedia.org/wiki/List_of_Olympic_Games_host_cities
Table, Total Rows: 24
List of countries ranked by the number of times they hosted the olympic games

| Rank | Country | Continent | Summer Olympics | Winter Olympics | Total |
|---|---|---|---|---|---|
| 1 | United States (USA) | North America | 294 (1904, 1932... | 4 (1932, 1960 ... | 8 |
| ... | | | | | |
| 3 | Russia (RUS) | Europe | 3 (10928, ~~1944~~, ... | 0 | 3 |
| ... | | | | | |
| 8 | South Korea | Asia | 1 (1988) | 1 (2018) | 2 |
| 8 | Soviet Union/Russia | Europe | 1 (1980) | 1 (2014) | 2 |

Bids for Olympic Games - Wikipedia, the free encyclopedia

SYSTEM AND METHOD FOR DISPLAYING TABLE SEARCH RESULTS

CROSS REFERENCE TO RELATED APPLICATION

This application claims priority to U.S. Provisional Application Ser. No. 62/003,560 entitled "Search Result Display" filed on May 28, 2014, which is incorporated herein by reference.

FIELD OF INVENTION

The present disclosure generally relates to search engine operations and method to display the results of a search operation. Particularly, the disclosure relates to improving user experience in viewing the search results and more particularly to a system and method for displaying table search results.

BACKGROUND

It is commonly required in the field of Information Technology to provide a service that searches through existing data sources including, but not limited to, the Internet, intranet, computer hard disks, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

Due to the high volume of information available on the Internet, search engines become a very useful tool to find information. While the popularity of search engines may rely on various factors; relevancy of the search results and the manner in which they are displayed play an important role in enhancing a user experience. Known search engines like Google®, Bing®, Yahoo® etc. typically display a search result page comprising multiple search results and for each search result an extract in a textual format. This is a disadvantage since some important visual cues in the document may be lost, thereby making the results less useful to a user. One example of such disadvantage is when the documents contain tabular data. When a user enters the search query for which a relevant result comprises a table, the search engines only display a relevant portion of the table based on keywords and few fragments around the keywords in a text format that makes it less useful for the reader.

Yet another drawback of existing search engines is that they fail to present results in a way that is easy for the user to understand the nature and type of results.

Systems for searching the Intranets, Extranets, Local Area Networks, individual computers and even single documents also generally suffer from these same drawbacks.

In view of the above drawbacks, there remains a need for an effective method of searching data sources for useful information relating to topics of user's interest.

SUMMARY

The following presents a simplified summary of the disclosure in order to provide a basic understanding of some aspects of the disclosure. This summary is not an extensive overview of the disclosure. It is not intended to identify key elements of the disclosure or to delineate the scope of the disclosure. Its sole purpose is to present some concepts of the disclosure in a simplified form as a prelude to the more detailed description that is presented later.

According to aspects illustrated herein, the present invention relates to a method to display the results of a search operation on at least one data source, wherein at least one result comprises a relevant portion of the data in a tabular form in an original document; said result comprising at least one search extract and optionally at least one table property; said search extract comprising a first component selected from a the relevant portion of the table and a second component selected from the rest of the table.

More specifically the present invention relates to a method of visually displaying the results of a search operation on at least one data source; wherein the second component comprises at least one portion selected from the group comprising header, footer, rows succeeding the header, rows preceding the footer and combinations thereof.

In a preferred embodiment, the second component comprises a header.

In another preferred embodiment, the second component comprises a footer.

In a third preferred embodiment, the second component comprises a header and a footer.

In a fourth preferred embodiment, the second component comprises a header, a row succeeding the header, a row preceding the footer, and the footer.

In another aspect of the present invention is provided a method of identifying the header or footer by data, metadata, suggestion or a calculated value. The visual display of the said header and footer in the search result extract may be in different presentation semantics than the rest of the search result.

Optionally, the search result in accordance with the present invention may include a title and a link to the original document.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics, such as, but not limited to, HTML, DHTML, XML, SGML, PDF, E-mail, Microsoft Word documents, Microsoft PowerPoint documents, news group postings, multimedia objects, Graphics Interchange Format images and/or Shockwave Flash files. Such documents may be a resource on WAN/LAN or a device.

Through the length of the specification and claims, the words "extract" and "snippet" are used interchangeably.

A table property in accordance with the present invention includes data related to a particular table including but not limited to number of rows and number of columns and combinations thereof.

A header in accordance to the present invention includes data or portion of the data in a tabular form placed at the top and/or side of the table comprising at least one row or column or both.

A footer in accordance to the present invention includes data or portion of the data in a tabular form placed at the bottom and/or side of the table comprising at least one row or column or both.

If the table has no header, the first row may be considered as the first row following the header and so on. If the table no footer, the last row may be considered as the first row preceding the footer and so on.

Figure 1:
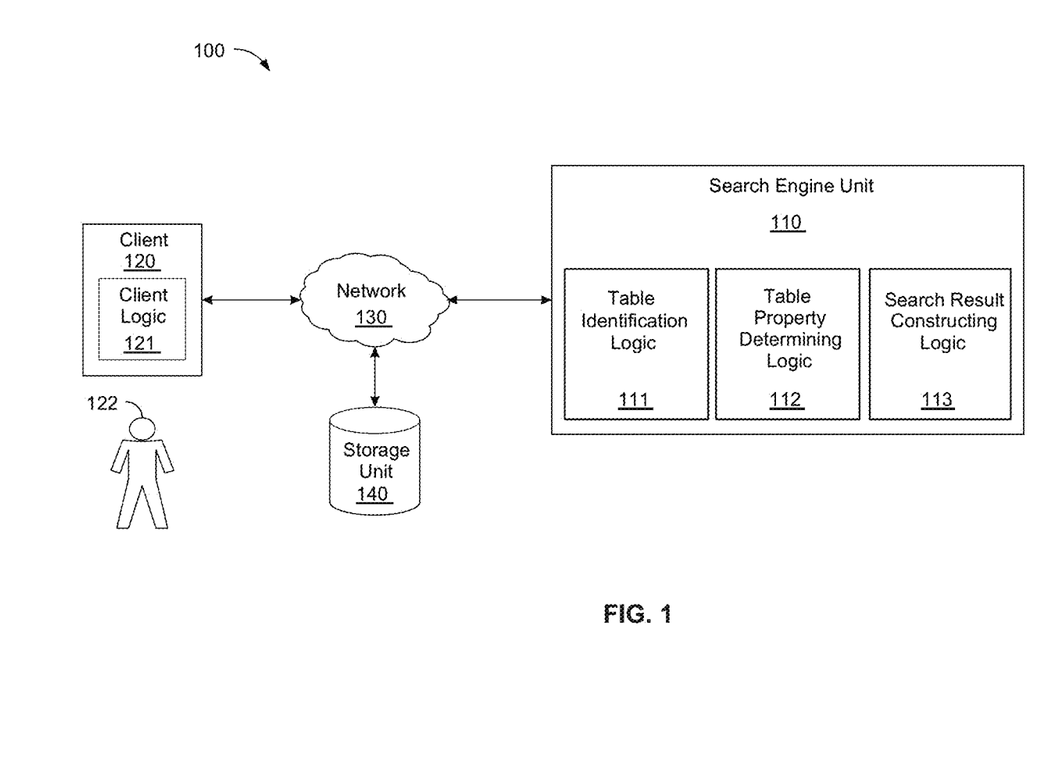
FIG. 1 is a block diagram illustrating an exemplary search engine system in accordance with an embodiment of the present invention.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises table identification logic 111, table property determining logic 112, and search result constructing logic 113.

In the exemplary search engine unit 110, the table identification logic 111 may be configured to identify presence or existence of a table within the search result. If a table is identified, then the table identification logic 111 may be further configured to identify the header, footer, rows following the header, rows preceding the footer.

The search engine unit 110 further comprises the table property determining logic 112. The table property determining logic 112 may be configured to determine the properties of tables identified by the table identification logic 111. The properties identified by the table property determining logic 112 may be, for example, number of rows, number of columns in the table etc.

The search engine unit 110 further comprises the search result constructing logic 113. The search result constructing logic 113 may be configured to construct the search result. For a search result with a presence of table within the search result, the process of constructing the search result may include adding the table properties identified by the table property determining logic 112 to the search result. For example, number of rows and number of columns may be included in the search result. The search result constructing logic 113 may also be configured to construct the snippet in such a way that the header, footer, rows following the header and rows preceding the footer identified by the table identification logic 111 may be included in the search result. The search result constructing logic 113 may also be configured to construct the snippet in such a way that table rows relevant to the search query are included. The search result constructing logic 113 is further explained with reference to FIG. 5.

The storage unit 140 is configured to store information associated with search results or the like. In various embodiments, such information may include, without limitation, domains, URLs, webpages, websites, documents, tables, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results, tables, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query, the search engine unit 110 examines the storage unit 140 and compiles a prioritized list of documents containing all or some of the keyword(s) and returns the search results comprising tables to the client logic 121 which displays the results to the user 122 in a window.

Figure 2:
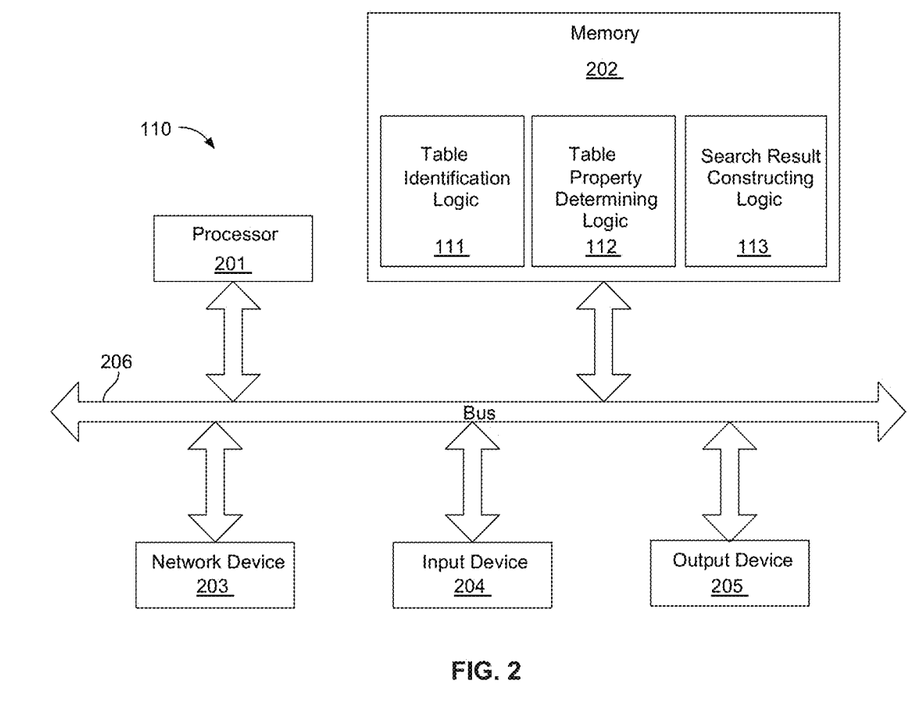
FIG. 2 is a block diagram illustrating an exemplary search engine computing device of FIG. 1.

FIG. 2 depicts an exemplary search engine unit 110 in accordance with an embodiment of the present disclosure. The search engine computing device 110 is only one example of a suitable computing environment and it is not intended to suggest any limitation as to the scope of use or functionality of the disclosure.

The exemplary embodiment of the search engine computing device 110 depicted by FIG. 2 may include a bus 206, a processing unit 201, memory 202, a network device 203, one or more input devices 204, and an output devices 205. Bus 206 may include a path that permits communication among the components of the search engine unit 110.

The memory 202 stores the table identification logic 111, the table property determining logic 112, and the search result constructing logic 113 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage device, including hard disks, floppy discs, or magnetic tapes, and optical discs.

The processing unit 201 comprises processing hardware for executing instructions stored in memory 202. Note that the processor 201 may be a microprocessor, a digital processor, or other type of circuitry configured to run and/or execute instructions.

The network device 203 may be any type of network device (e.g., a modem) known in the art or future-developed for communicating over the network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone. Notably, only one input device 204 is shown in FIG. 2; however, the search engine computing device 110 may include additional input devices in another embodiment.

The output device 205 is any type of output device known in the art or future-developed for displaying data. As an example, the output device 205 may be a liquid crystal display (LCD) or other type of video display device, a speaker, or a printer. Notably, only one output device 205 is shown in FIG. 2; however, the search engine computing device 110 may include additional output devices in another embodiment.

Further note that, the search engine unit 110 (FIG. 1) components may be implemented by software, hardware, firmware or any combination thereof. In the exemplary search engine unit 110 (FIG. 1), depicted by FIG. 1, all the components are implemented by software and stored in memory 202.

Figure 3A:
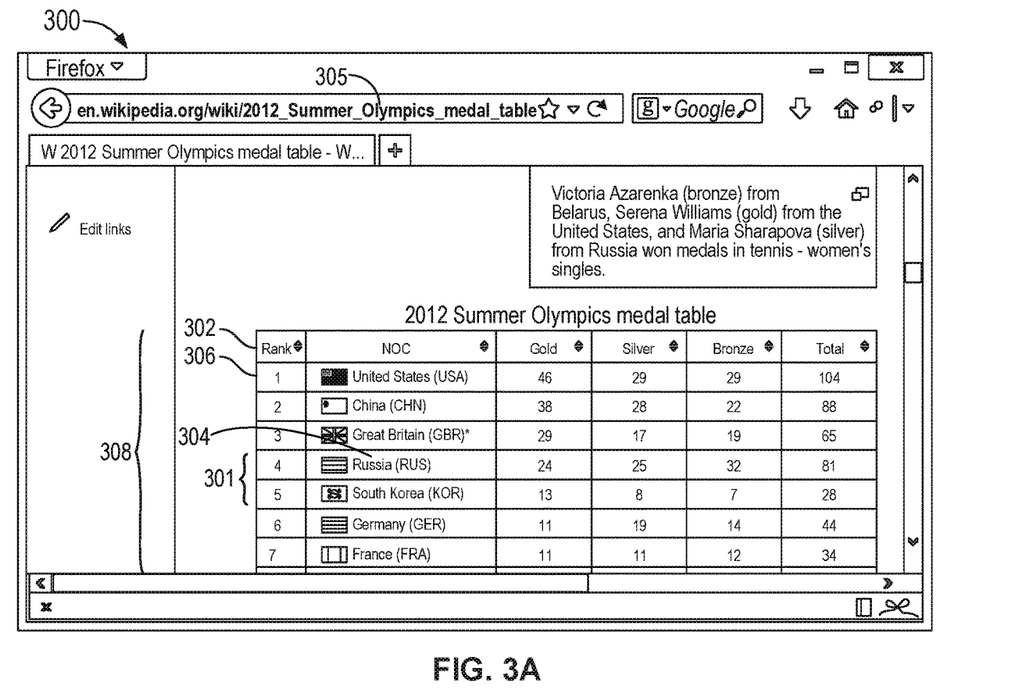
FIG. 3A is a portion of an exemplary web page comprising data formatted in a tabular form.
Figure 3B:
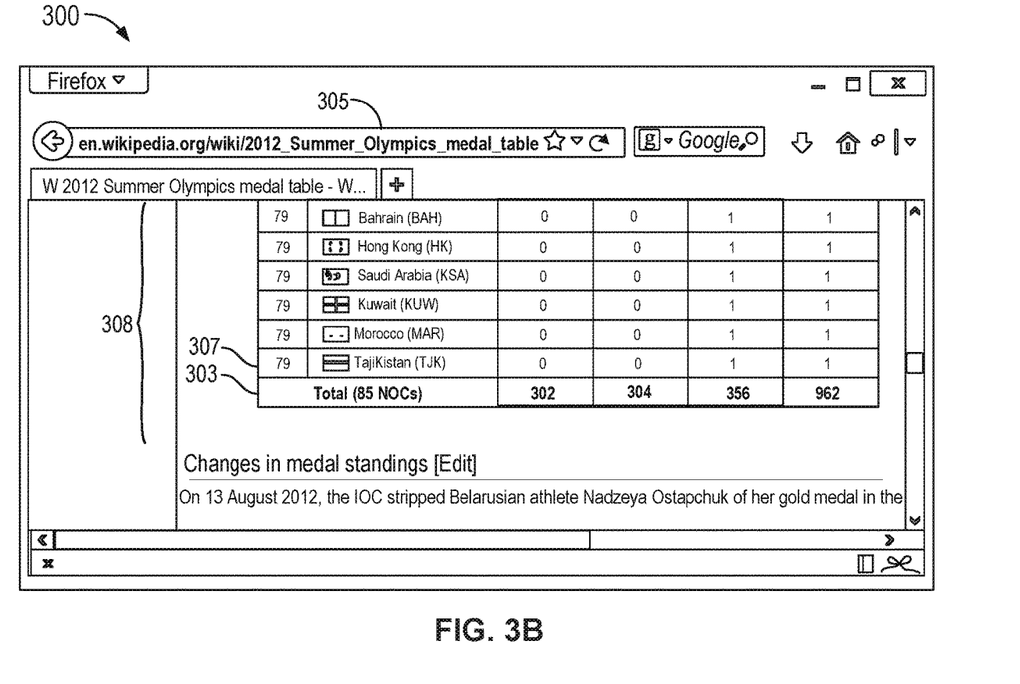
FIG. 3B is another portion of the exemplary web page of FIG. 3A.

FIG. 3A and FIG. 3B illustrate portions of an exemplary web page 300 with a URL 305. For the purpose of this example, the web page 300 is an original document in accordance with the invention. The document comprises among other things a table 308 listing with a header 302, footer 303, row succeeding the header 306, row preceding the footer 307 and other data.

Figure 4:
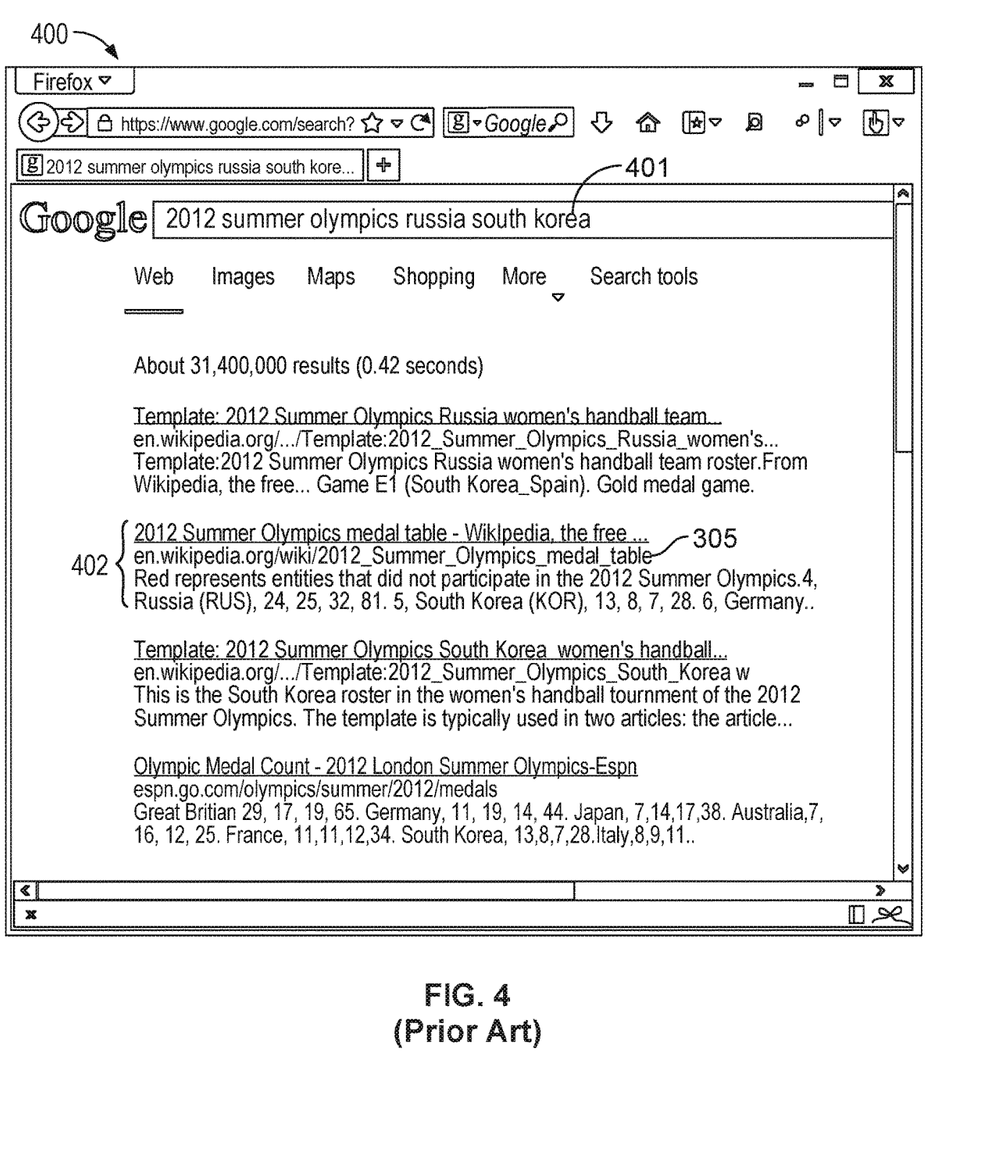
FIG. 4 and FIG. 5 depict an exemplary search operation with a comparative illustration of known prior art methods and methods in accordance with the present invention.
Figure 5:
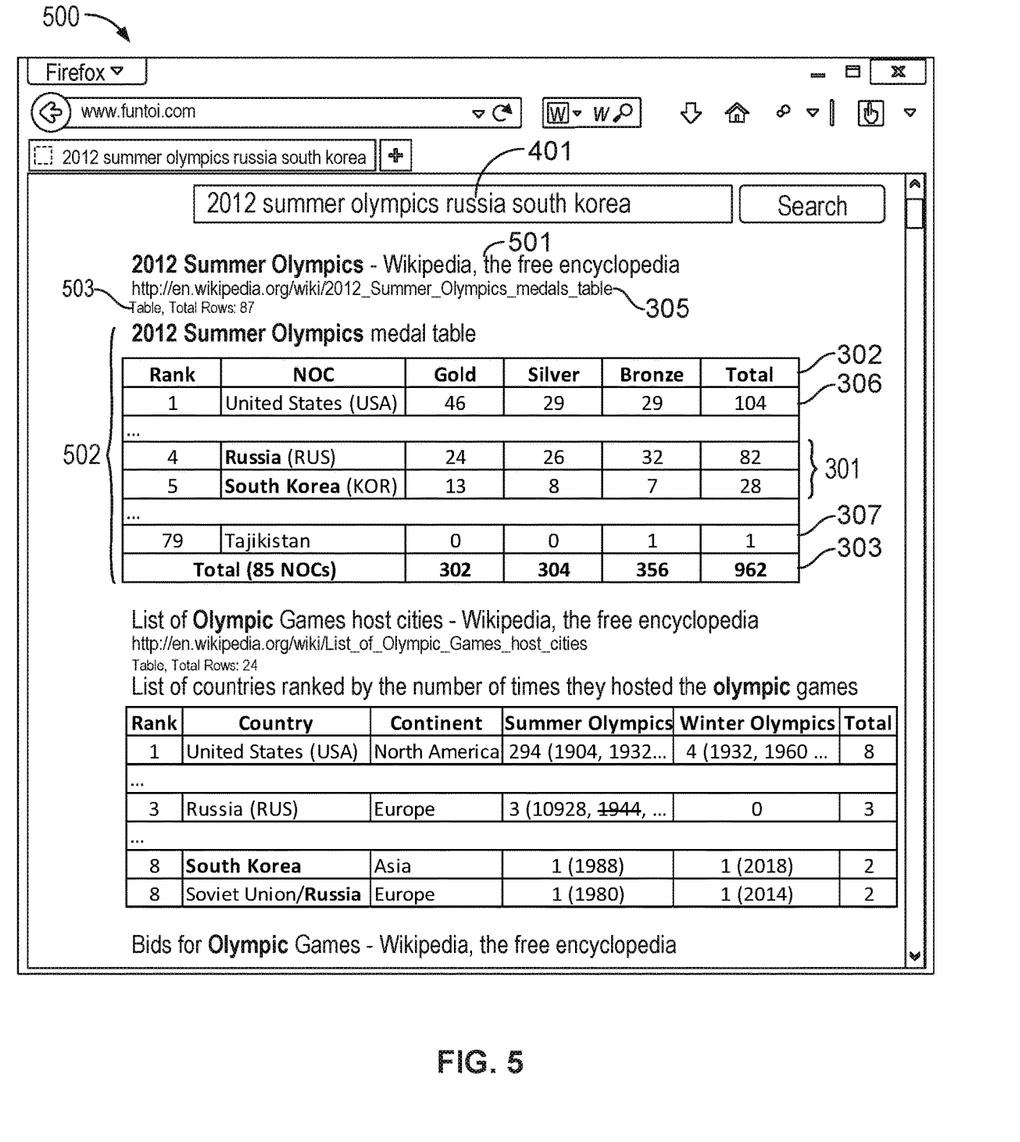

FIG. 4 and FIG. 5 are exemplary illustration of a search engine operation in prior art and in accordance with the present invention.

FIG. 4 illustrates a search operation carried out on Google® by a user. When the user enters a search query 401 "2012 summer olympics russia south korea", the search engine searches through a given data source and display results in the form of a web page 400. The said search result 402 displays an extract comprising fragments of the web page 300 (FIG. 3) containing the keywords—2012, summer, olympics, russia, south, and korea. The display is in the form of a textual paragraph. While the results identify the keywords, they are not displayed in the visual type (table) as in the original document and hence the user cannot make the entire context of the keywords in relation to each other. To learn more, a user has to click on the URL 305 (FIG. 3) of the search result to open the web page 300 to find relevant information.

Furthermore, the header 302 (FIG. 3) and the footer 303 (FIG. 3) are omitted from the search extract. Without the header 302 (FIG. 3) and the footer 303 (FIG. 3) it may be impossible for the user to comprehend the information within the extract of the search result 402.

The current invention overcomes the above shortcomings of prior methods; an example of which is illustrated in FIG. 5.

FIG. 5 is an illustrative example 500 of methods in accordance with the present invention. In the current example, when a user enters a search query 401 "2012 summer olympics russia south korea", the search engine unit 110 (FIG. 1) may return search results to the user in the form of the search result page 500. The search result 501 is constructed by the search result constructing logic 113 (FIG. 1). The search result 501 comprises a snippet 502 from the document 300 (FIG. 3) identified by the URL 305. The search snippet 502 comprises data from table 308 (FIG. 3). The snippet 502 comprises header 302 (FIG. 3), row succeeding the header 306 (FIG. 3), footer 303 (FIG. 3), row preceding the footer 307 (FIG. 3) along with the relevant rows 301 (FIG. 3) to the user search query 401 to enhance the user experience. The table 308 (FIG. 3) and the header 302 (FIG. 3), row succeeding the header 306 (FIG. 3), footer 303 (FIG. 3), row preceding the footer 307 (FIG. 3) are identified by the table identification logic 111 (FIG. 1). The table identifying logic 111 (FIG. 1) identifies table 308 (FIG. 3) by the border and the markup tags surrounding the table 308. The table identifying logic 111 identifies header 302 (FIG. 3) and footer 303 (FIG. 3) from the higher font weight for rows 302 (FIGS. 3) and 303 (FIG. 3).

The search result 501 further comprises of table properties 503. The table properties are computed by the table property determining logic 112 (FIG. 1).

Figure 6:
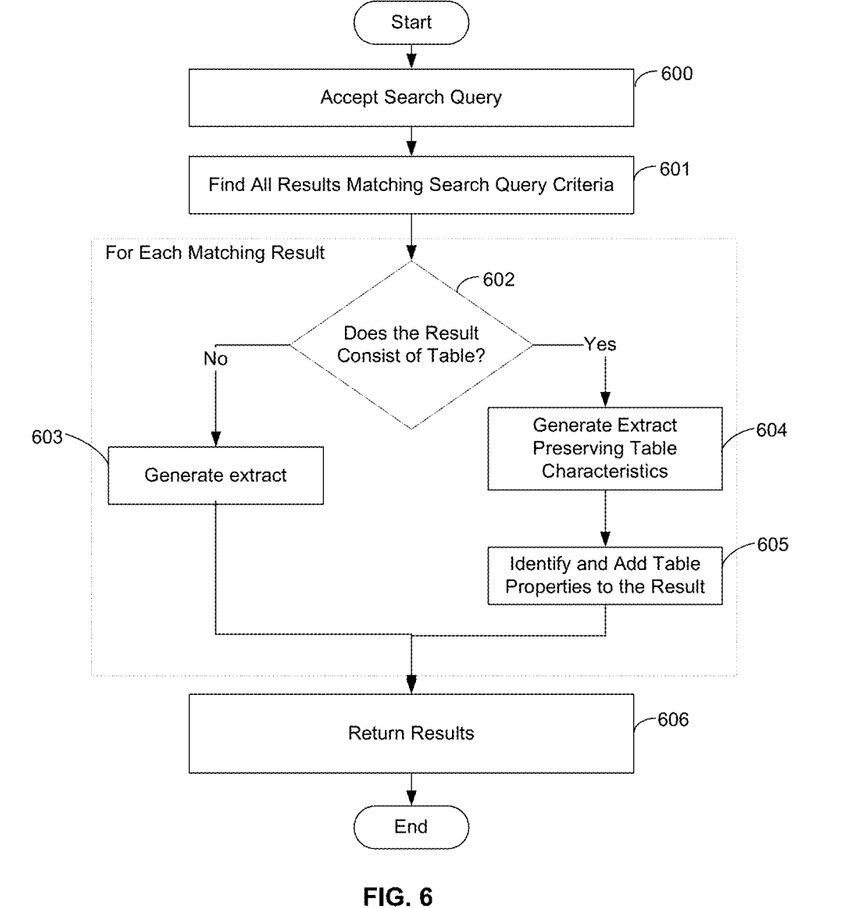
FIG. 6 is a flowchart detailing one embodiment of the present invention.

FIG. 6 is a flow chart illustrating one method in accordance with the present disclosure. In step 600, the search engine unit may accept the search query and find all results matching the search query criteria 601. For each matching search result, the search engine determines if any of the results comprise of a table 602. In absence of a table, the search engine generates extract in textual format 603 and returns the results to the user 606. If any of the matching search results comprise a table, the search engine generates extracts preserving the table characteristics 604. The table characteristics may include header, footer, row succeeding the header, row preceding the footer. Further the search engine may identify and add table properties to the extract 605 and return the results to the user 606.

The invention claimed is:

1. A method executable on a computing device comprising a processor, memory and a storage unit to display results of a search operation on at least one data source comprising documents, said method comprising:
   (a) Accepting a search query comprising keyword(s) from a user;
   (b) Generating search result(s) by identifying document(s) comprising the keyword(s) in response to the search query;
   (c) Identifying, by the processor, at least one search result wherein the keyword(s) are present within a table in the search result document;
   (d) Extracting, by the processor, from the table a relevant portion of the table comprising the keyword(s) and a second portion of the table selected from a group consisting of header, footer, rows succeeding the header, rows preceding the footer and combinations;
   (e) Constructing, by the processor, a search result extract for the search result consisting of the relevant portion and the second portion; and
   (f) Returning the search result(s) comprising the search result extract.

2. The method as in claim 1, wherein the relevant portion and the second portion of the search extract are formatted in textual form.

3. The method as in claim 1, wherein the relevant portion and the second portion of the search extract are formatted in tabular form.

4. The method as in claim 1, wherein the header is identified by data, metadata, suggestion or a calculated value of the table.

5. The method as in claim 1, wherein the footer is identified by data, metadata, suggestion or calculated value of the table.

6. The method as in claim 1, wherein the header and/or footer are in a different presentation semantics than rest of the search result.

7. A method executable on a computing device comprising a processor, memory and a storage unit to display results of a search operation on at least one data source comprising documents, said method comprising:
   (a) Accepting a search query comprising keyword(s) from a user;
   (b) Generating search result(s) by identifying document(s) comprising the keyword(s) in response to the search query;
   (c) Identifying, by the processor, at least one search result wherein the keyword(s) are present within a table in the search result document;
   (d) Determining, by the processor, one or more table properties for the table by computing data related to the table;
   (e) Constructing, by the processor, the search result by incorporating the one or more table properties into the search result; and
   (f) Returning the search result(s) comprising the one or more table properties.

8. The method as in claim 7, wherein the table properties are selected from a group consisting of number of rows, number of columns and combinations thereof.

* * * * *